Aug. 26, 1958    H. O. SCHJOLIN ET AL    2,849,087
WHEEL AND BRAKE ASSEMBLY

Filed June 19, 1953            5 Sheets-Sheet 1

INVENTOR.
Hans O. Schjolin
Donald K. Isbell
BY
their Attorney

INVENTOR.
Hans O. Schjolin
Donald K. Isbell
their Attorney

INVENTOR.
Hans O. Schjolin
Donald K. Isbell
BY
their Attorney

Aug. 26, 1958    H. O. SCHJOLIN ET AL    2,849,087
WHEEL AND BRAKE ASSEMBLY

Filed June 19, 1953    5 Sheets-Sheet 4

INVENTOR.
Hans O. Schjolin
Donald K. Isbell
BY
their Attorney

United States Patent Office

2,849,087
Patented Aug. 26, 1958

2,849,087

WHEEL AND BRAKE ASSEMBLY

Hans O. Schjolin, Birmingham, and Donald K. Isbell, Pontiac, Mich., assignors to General Motors Corporation, Detroit, Mich., a corporation of Delaware Application June 19, 1953, Serial No. 362,838

10 Claims. (Cl. 188—18)

This invention relates to a wheel assembly for a motor vehicle, and particularly to a wheel assembly including a brake structure incorporated therein. The wheel structure incorporating a brake assembly as disclosed herein is particularly adapted for use as a front wheel of a motor vehicle.

It is conventional practice in wheel structures adapted for use as front wheels of a motor vehicle to assemble the wheel and brake structure in a manner that requires removal of the wheel from a spindle supporting the same to gain access to a brake. If a wheel is not removed from its supporting spindle, the mechanic is required to lay underneath the motor vehicle to work on a brake assembly from the inside of the wheel. Thus even minor brake adjustments become a major servicing operation, and is a particularly dirty operation in winter weather when the underside of a vehicle is coated with snow and mud and ice.

It is therefore an object of this invention to provide a wheel assembly incorporating a brake structure wherein all servicing operations for the wheel and the brake structure can be accomplished from the "outside" of the wheel.

It is also an object of the invention to provide a brake structure incorporated in a wheel in such a manner that the brake structure can be removed for service and repair without requiring removal of the wheel. This is accomplished by constructing the wheel for a motor vehicle with an open side that is on the outside of the wheel with the brake structure installed in the wheel through the open side thereof, the open side of the wheel being on the "outside" thereof.

It is another object of the invention to provide a wheel incorporating a brake structure wherein the brake drum is supported on the wheel by a plurality of land areas adjacent each of opposite edges of the brake drum, and also to arrange the land areas relative to each other so that opposite edges of the brake drum are alternately supported, thus more uniformly supporting the entire periphery of the brake drum.

It is a still further object of the invention to provide a supporting structure for a brake drum in accordance with the foregoing object wherein the brake drum is aligned with the axis of the wheel both radially and normal to the axis of the wheel, the foregoing alignments being accomplished by a plurality of land areas between the brake drum and the wheel rim for radial alignment and by radially disposed flanged means on the drum engaging alignment faces that are normal to the axis of the wheel.

It is still a further object of the invention to provide a wheel incorporating a brake drum in accordance with the foregoing object wherein the brake drum is demountably attached to the wheel.

It is another object of the invention to provide a wheel assembly incorporating a brake structure wherein the wheel is provided with an annular mounting ring to which both the brake drum and a tire rim are demountably secured and wherein the tire rim is supported by the mounting ring.

It is another object of the invention to provide a wheel structure and brake assembly therein wherein the wheel spider is constructed and arranged to provide a centrifugal air pump for circulating air around the brake assembly, and also to provide for circulation of air through the brake assembly.

Further objects and advantages of the present invention will be apparent from the following description, reference being had to the accompanying drawings wherein a preferred form of the invention is clearly shown.

Figure 1:
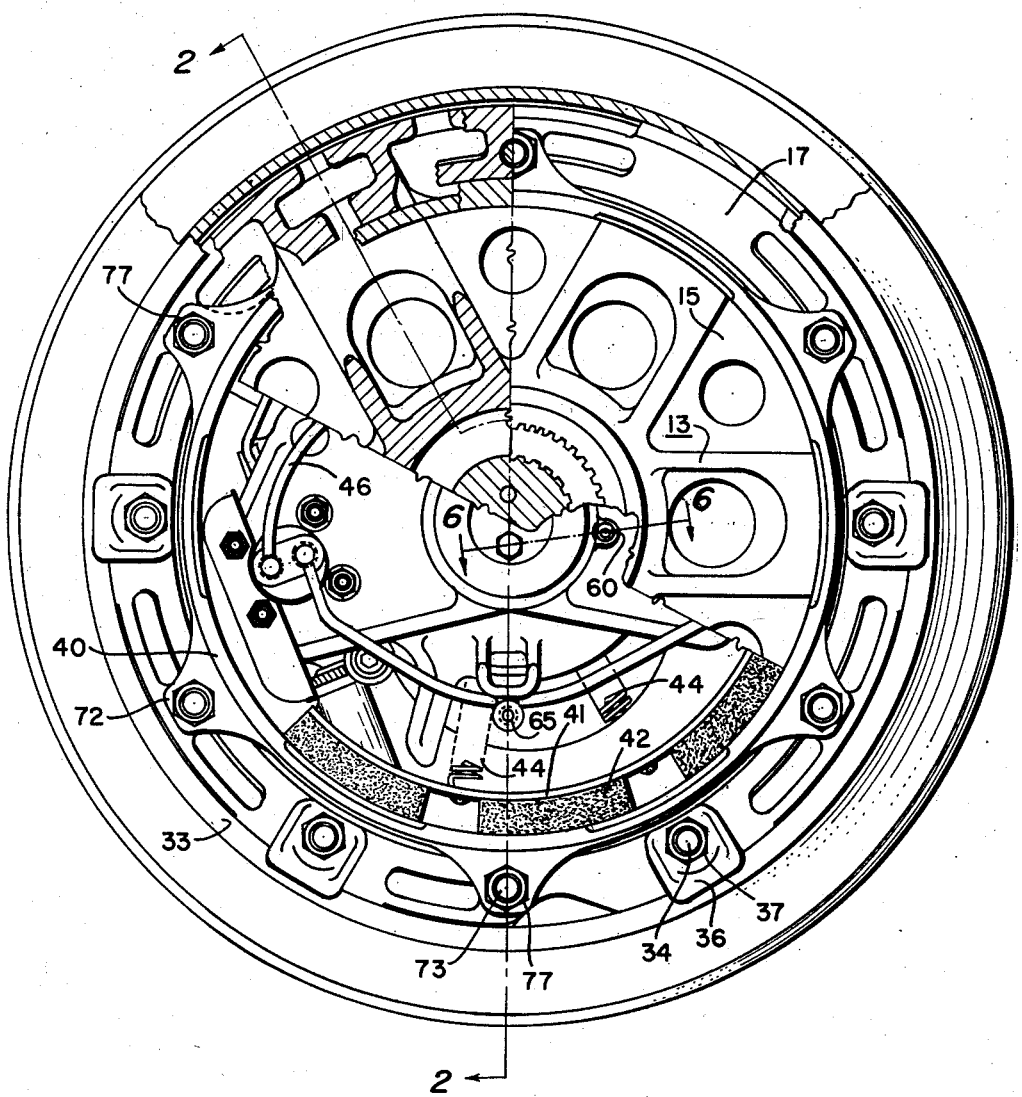
Figure 1 is a side view of a wheel assembly incorporating a brake structure constructed in accordance with this invention with certain parts of the brake and wheel structure broken away to more clearly illustrate the construction of the several parts.

In this invention the wheel structure incorporating a brake is illustrated as applied to the front wheel of a motor vehicle wherein the wheel and brake structure is mounted on a stationary spindle 10 that extends horizontally from a king-pin housing 11.

The wheel structure comprises a bearing hub 12 from which there extends a plurality of spokes 13 forming a spider. The spokes 13 radiate from the rear side of the bearing hub 12 and are positioned equidistantly about the bearing hub.

Each of the spokes 13 consists of a pair of webs 14 that are joined by a rear wall 15. The webs 14 extend forwardly relative to the bearing hub 12 and terminate in a rim portion 16, the terminus end of which forms a mounting ring 17. The wheel rim portion 16 thus encircles the bearing hub 12.

The webs 14 are joined by a front wall 100 that is spaced from the rear wall 15, the several walls of the spokes 13 forming a radial chamber 101 that has its inner end adjacent the hub 12 and its outer end adjacent the rim portion 16. An opening 102 is provided in the rear wall 15 of the spokes 13 and an opening 103 is provided in the front wall 100 whereby air can pass through the openings 102 and 103 from the inboard side of the wheel structure toward the outboard side thereof.

The rim portion 16 has an opening 104 therein and the upper end of the front wall 100 of the spokes 13 has an opening 105 therein whereby air can circulate from the chamber 101 and through the openings 104 and 105 in a manner more particularly pointed out hereinafter.

The bearing hub 12 of the wheel is supported upon the stationary spindle 10 by means of the tapered roller bearings 18 and 19 placed at each end of the hub 12. The bearing assembly 18 engages an annular ring 20 that provides a stop for the bearing 18 when urged in a rightward direction by the shoulder 21 in the bearing hub 12.

The spindle 10 has a threaded portion 22 that receives an annular ring 23 in threaded engagement therewith.

The annular ring 23 engages the forward bearing assembly 19 which is pressed against the shoulder 24 in the bearing hub 12. Rotation of the annular ring 23 upon the spindle 10 tightens the ring against the bearing assembly 19 which in turn urges the bearing hub 12 and the bearing assembly 18 in a rightward direction to tighten the bearing assemblies 18 and 19 in operating position. The annular ring 23 is locked in the position thus attained in a manner hereinafter described.

An oil seal 25 is placed at the rear end of the bearing hub 12. A corresponding oil seal 26 is placed at the forward end of the bearing hub 12. Lubricant is admitted to the bearing hub 12 through the passageways 27 and 28.

The mounting ring 17 of the wheel is provided with a plurality of land areas or mounting pads 29 spaced equidistantly around the forward and outer peripheral edge of the mounting ring 17. These land areas or mounting pads 29 provide peripherally spaced areas that are engaged by the tire rim 30 for support of the tire rim on the wheel.

Each of the land areas or mounting pads 29 comprise an arcuate surface 31 that is parallel with the axis of the wheel and a second arcuate surface 32 that is coextensive with the surface 31 and angular relative to the same and relative to the axis of the wheel. The surface 31 provides for accurate coaxial positioning of the tire rim 30 relative to the axis of the wheel. The surface 32 forms a wedge surface against which the angularly displaced peripheral edge 33 of the tire rim is positioned to rigidly retain the tire rim 30 on the mounting ring 17.

Intermediate the ends of each of the mounting pads 29 there is provided a mounting stud 34 that is in threaded engagement with the mounting ring 17 by the threaded end 35 thereof. A rim lug 36 is carried on the mounting stud 34 and is held in engagement with the forward edge 33 of the tire rim 30 by means of the lug nut 37, thereby retaining the tire rim 30 on the wheel.

The brake assembly that is placed within the wheel includes the brake drum 40 and a plurality of brake shoes 41. The brake shoes 41 carry suitable lining elements 42 for engagement with the drum 40. The shoes 41 are supported from a brake spider 43, suitable retraction springs 44 being provided to retain the brake shoes out of engagement with the drum 40. The brake shoes 41 are operated by means of the wheel cylinders 45 that are supplied with hydraulic fluid through the fluid line 46 as supplied through the spindle 10 through the passages 47 and 48. The passages 47 and 48 are connected with a master cylinder of a hydraulic brake system in conventional manner. The wheel cylinders 45 are connected with the brake shoes 41 in a conventional manner for actuating the same.

The brake spider 43 has a hub 49 that is provided with an internal spline adapted to fit upon the spline 50 provided on the projecting end of the spindle 10. An annular ring 51, also suitably splined to fit upon the spline 50 engages the forward end of the threaded portion 22 to prevent the hub 49 of the brake spider 43 from riding upon the threaded portion 22. The brake spider 43 is held in position on the end of the spindle 10 by means of a retaining plate 52 that is secured to the spindle 10 by means of bolts 53. Thus, the brake spider 43 is stationarily mounted on the stationary spindle 10.

Figure 6:
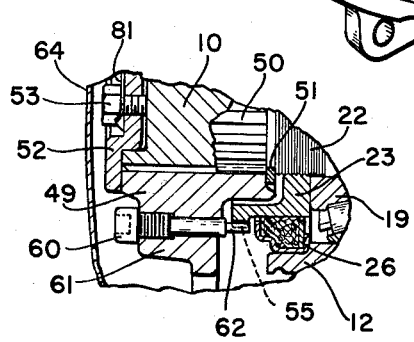
Figure 6 is a cross sectional view taken along line 6—6 of Figure 1 showing a locking pin.

The annular ring 23 that is in threaded engagement with the threaded portion 22 on the spindle 10 is provided with an annular portion 54 the periphery of which is serrated by a series of teeth 55. A locking pin 60 is journaled in the hub 49 of the brake spider 43 and is in threaded engagement therewith with the portion 61 as illustrated in Figure 6. The forward end of the locking pin 60 has a reduced diameter portion 62 that extends between the teeth 55 thereby locking the ring 23 from rotation.

To provide for adjustment of the bearing assemblies 18 and 19, there is provided in the hub 49 of the brake spider 43 an opening 63 that has the periphery thereof substantially aligned with the teeth 55 on the ring 23. A wrench having a gear-end complementary to the gear teeth 55 is adapted to be extended through the opening 63 to place the gear-end of the wrench in the teeth 55 for rotating the ring 23 when the locking pin is removed. Thus, the bearing assemblies 18 and 19 can be adjusted at any time from the outside of the wheel and brake assembly.

A cover plate or hub cap 64 is mounted on a plurality of studs 65 on the brake spider 43 whereby the cover plate 64 is stationarily mounted relative to the wheel.

Figure 3:
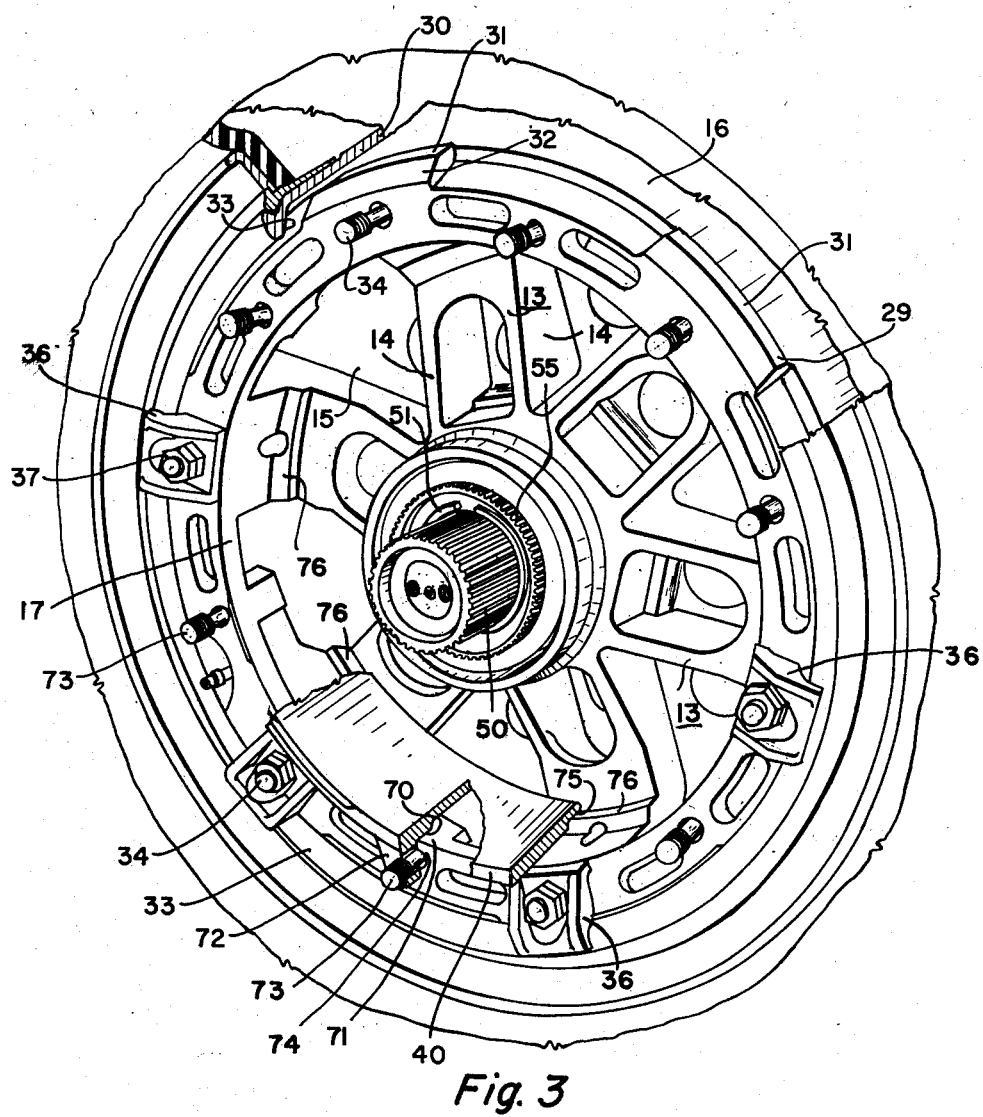
Figure 3 is a perspective elevational view of the wheel assembly of this invention with a part of the brake structure shown to illustrate the mounting of the brake drum on the wheel structure.
Figure 5:
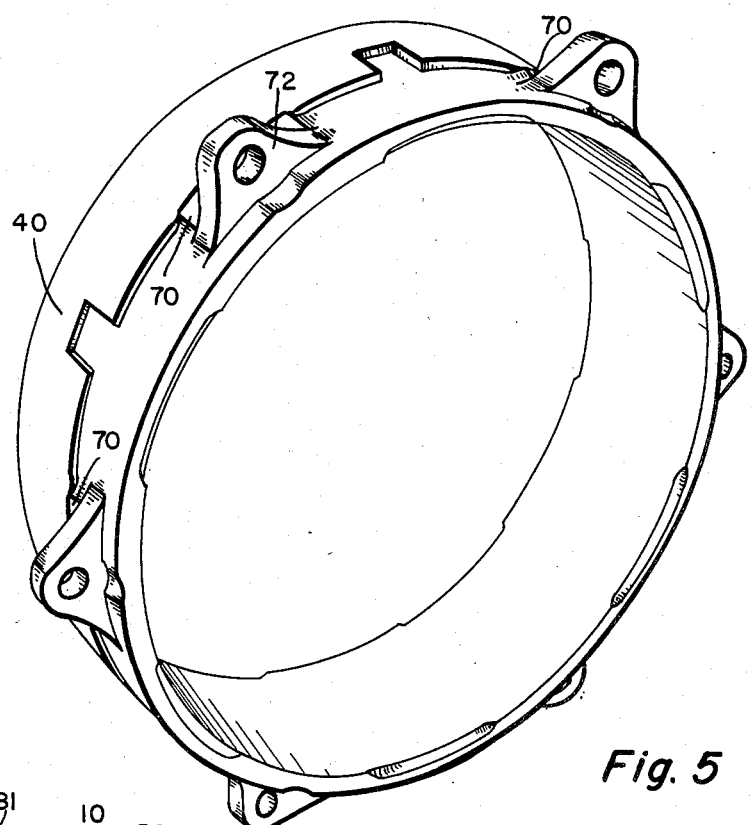
Figure 5 is a perspective elevational view of the brake drum incorporated in the brake structure of this invention.

The brake drum 40 of the brake assembly is provided with a plurality of land areas 70 as illustrated in Figure 5, adjacent the forward edge of the drum. These land areas 70 are spaced equidistantly about the outer periphery of the drum 40 and engaging an annular ring 71 provided on the inner periphery of the mounting ring 17, as illustrated in Figure 3. Adjacent each of the land areas 71 there is provided a flange lug 72 that engages a mounting stud 73 carried in the mounting ring 17. The flange lug 72 has the rear face thereof finished normal to the axis of the brake drum 40 for engagement with the surface 74 on the forward face of the mounting ring 17 that is normal to the axis of the wheel. These cooperating faces position the brake drum 40 normal to the axis of the wheel while the adjacent land areas 70 on the drum 40 coaxially position the drum relative to the axis of the wheel.

The rear edge of the brake drum 40 is provided with an annular surface 75 that engages land areas 76 provided on the wall portion 100 of the wheel, each of the land areas 76 being at the upper end of the spokes 13. There land areas 76 support the rear edge of the brake drum 40 and coaxially align the rear edge of the drum with the axis of the wheel.

From Figure 3 it will be noted that the engagement between the land areas 70 on the drum 40 and ring 71 of the mounting ring 17 are positioned midway between the engagement between the land areas 76 on the rim portion 16 of the wheel and the rear periphery of the drum. The alternate engagement between the forward and rear edges of the brake drum provide for more complete peripheral support of the brake drum than would be provided with the mounting engagements of the drum in axial alignment. This avoids distortion of the drum between the points of engagement of the drum with the wheel. The land areas 76 provide pilot engagement of the rear edge of the drum with the wheel to prevent axial mis-alignment of the drum relative to the wheel when the lug nuts 77 are tightened upon the mounting stud 73.

Also, it will be noted in Figure 3 that the mounting engagement of the tire rim 30 is coaxially aligned with the spokes 14 of the wheel whereby the mounting points for the rim 30 are positioned in alignment with the most rigid structure of the wheel.

Figure 4:
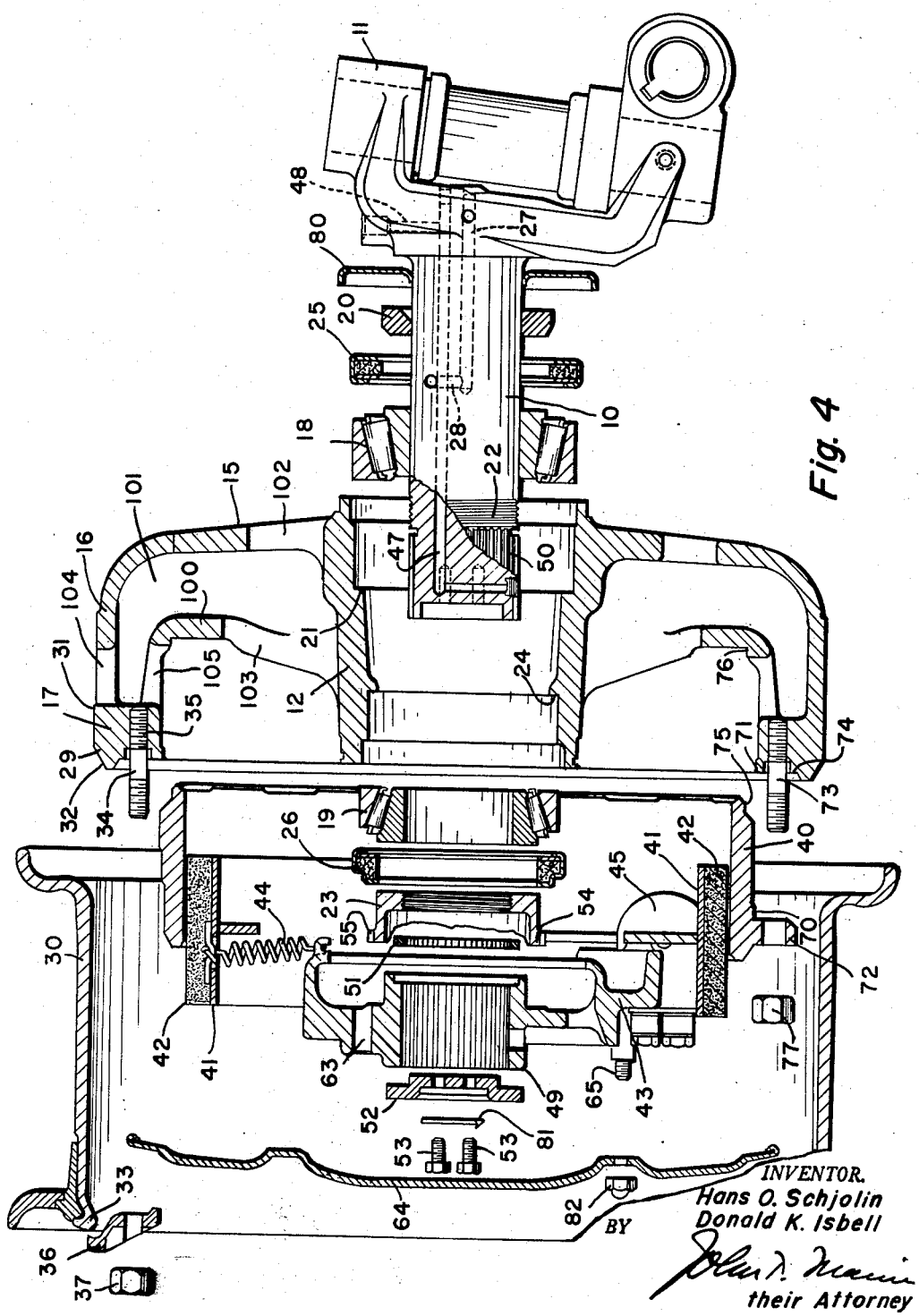
Figure 4 is a transverse cross sectional view similar to Figure 2 but with the parts in an exploded relationship positioned for their respective order of assembly.

In Figure 4 the wheel structure and brake assembly is illustrated with the respective parts in position for assembly upon the wheel spindle 10. A closure cap 80 is first placed upon the spindle 10. Thereafter, the ring 20 the bearing seal 25 and the bearing assembly 18 are placed on the spindle 10 in that order. The hub 12 of the wheel is then placed over the rear bearing 18 and the forward bearing 19 is placed within the bearing hub 12 and on the spindle 10. Thereafter, the grease seal 26 is placed on the spindle and then the annular ring 23 is threaded into engagement with the threaded portion 22 on the spindle 10. The ring 23 is tightened upon the bearing 18 to provide the desired degree of tightness to the front wheel bearing assemblies 18 and 19.

The brake drum 40 is then placed within the wheel structure with the drum portion 75 engaging the land areas 76 and the land areas 70 engaging the annular ring 71 to coaxially align the brake drum with the wheel axis. The lug nuts 77 are then tightened upon the mounting lugs 73 to retain the brake drum within the wheel.

The hub 49 of the brake assembly is then placed on the projecting end of the spindle 10, the retaining plate 52 being placed against the hub 49 and secured to the spindle 10 by the bolts 53, a locking plate 81 being provided between the heads of the bolts 53 and the plate 52.

Upon assembly of the brake structure on the spindle, if the bearing assemblies 18 and 19 have not previously been adjusted, they can now be adjusted by insertion of the tool heretofore described through the opening 63, whereafter the locking pin 60 is inserted into the hub 49 of the brake spider 43 to lock the ring 23 against rotation.

After assembly of the brake structure, the tire rim 30 may be placed upon the mounting ring 17 of the wheel in engagement with the land areas 29, the wheel lugs 36 and the lug nuts 37 retaining the tire rim in place on the wheel.

Thereafter, the closure plate or hub cap 64 is mounted on the brake spider 43 by the nuts 82.

Figure 2:
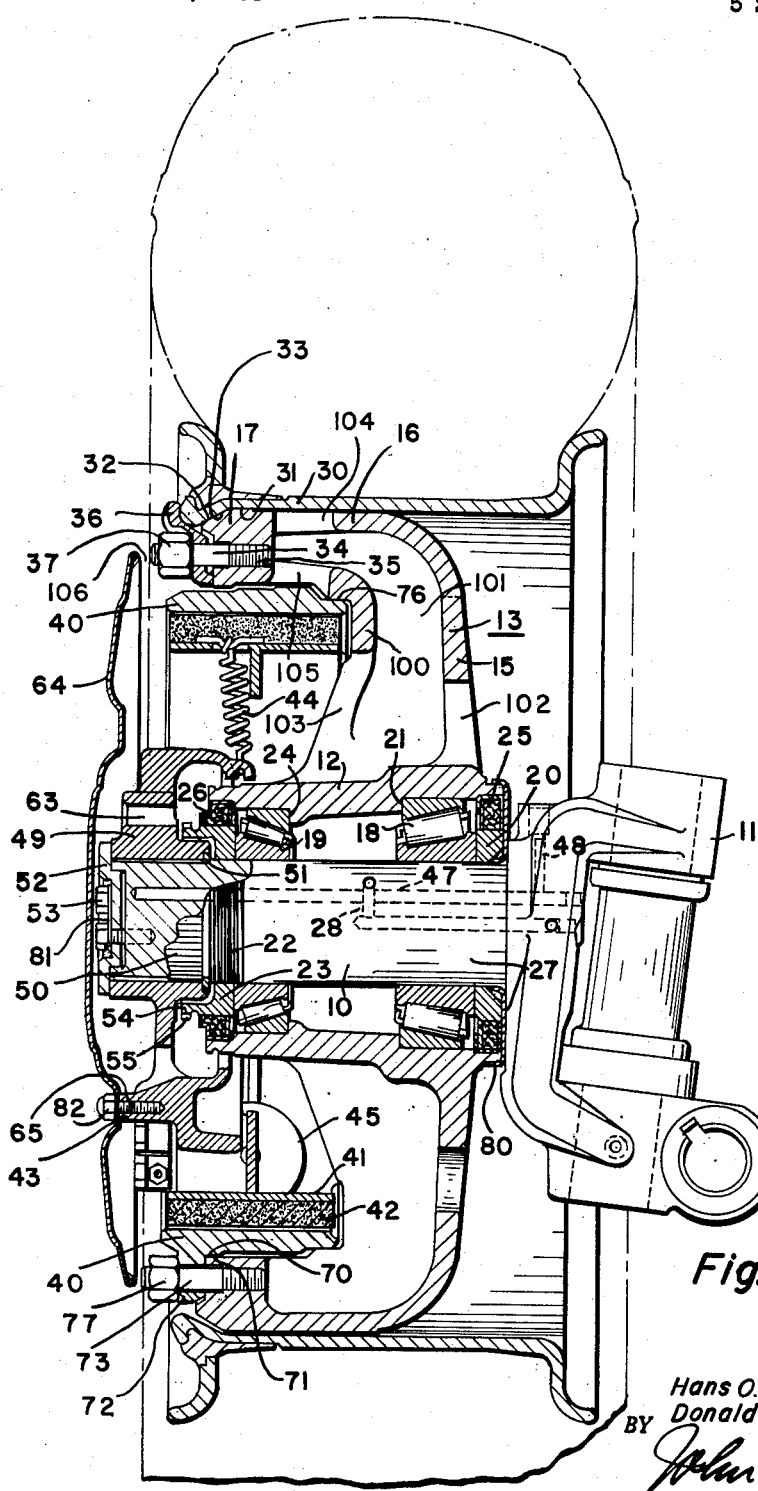
Figure 2 is a transverse cross section taken substantially along line 2—2 of Figure 1.

When the brake drum is positioned within the wheel structure, as illustrated in Figure 2, the closure plate or hub cap 64 is positioned in spaced relationship relative to the forward edge of the wheel assembly. Thus, air can circulate from the inboard side of the wheel assembly through the openings 102 and 103 in the wheel spokes 13 and thus through the brake assembly for discharge through the opening 106 radially of the hub cap 64 and between the same and the forward edge of the wheel structure. Also, air entering through the opening 102 on the inboard side of the spokes 13 can pass radially through the chamber 101 and discharge through the openings 105 around the exterior of the brake drum 40. Thus, the spokes 13 act as a centrifugal air pump for forcefully circulating air over the outer periphery of the brake drum 40.

While the form of embodiment of the invention as herein disclosed constitutes a preferred form, it is to be understood that other forms might be adopted as may come within the scope of the claims which follow.

What is claimed is as follows:

1. In a brake for a motor vehicle, the combination of: a wheel comprising a bearing hub, a rim portion, and a support structure between said hub and said rim portion; a brake drum encircled by said rim portion and engaging the same for support thereby; said drum having peripheral engagement thereof with said rim portion at peripherally spaced engaging land areas; said land areas being disposed alternately at opposite supporting edges of said drum about the periphery thereof; and attachment means between said rim portion and said drum demountably attaching said drum on said rim portion.

2. In a brake for a motor vehicle, the combination of: a wheel comprising a bearing hub, a rim portion, and a support structure comprising a plurality of spokes between said hub and said rim portion; a brake drum encircled by said rim portion and engaging the same for support thereby; a plurality of support pad means adjacent one peripheral edge of said drum between said drum and said spokes for support thereof thereby; a plurality of support pad means adjacent the other peripheral edge of said drum between said drum and said rim portion for support thereof thereby and disposed peripherally of the drum midway between the said spoke pads, and attachment means between said rim portion and said drum demountably attaching said drum on said rim portion.

3. In a brake for a motor vehicle, the combination of: a wheel comprising a bearing hub, a rim portion, and a support structure between said hub and said rim portion; a brake drum encircled by said rim portion and engaging the same for support thereby; a plurality of support pad means adjacent one peripheral edge of said drum between said drum and said rim portion for support thereof thereby; a plurality of support pad means adjacent the other peripheral edge of said drum between said drum and said rim portion for support thereof thereby; said pad means on said one edge being spaced peripherally of the drum midway between the pad means on said other edge of said drum; and attachment means between said rim portion and said drum demountably attaching said drum on said rim portion.

4. In a brake for a motor vehicle, the combination of: a wheel comprising a bearing hub, a rim portion, and a support structure between said hub and said rim portion; a brake drum encircled by said rim portion and engaging the same for support thereby; said drum having radially extending flange portions thereon adjacent one peripheral edge of said drum each having a radially extending face portion engaging said rim portion for mounting thereof thereon; demountable attachment means between said rim portion and said flange demountably securing said drum on said rim portion; means providing a plurality of engaging land areas each coextensive with and angular to said flange face portions for supporting said drum there adjacent; and means forming a plurality of engaging land areas between said drum and said rim portion at the other peripheral edge of said drum disposed peripherally intermediate the said flange faces for supporting said drum thereby.

5. In a wheel assembly for a motor vehicle, the combination of: a wheel comprising a bearing hub, and a rim portion and support structure for the same between the hub and the rim portion with the support structure extending radially of the hub and the rim portion extending axially thereof with the support structure at one end of the rim portion; a brake drum within the inner periphery of said rim portion and engaging the same for support thereby; said drum having peripheral engagement thereof with the inner periphery of said rim portion at peripherally spaced engaging land areas; said land areas being disposed alternately at opposite supporting edges of said drum about the periphery thereof; attachment means between said rim portion and said drum demountably attaching said drum on said rim portion; said rim portion also having a plurality of peripherally spaced supporting land areas on the exterior periphery thereof and disposed at one edge of said rim portion; a tire rim encircling said rim portion and supported thereon by the said exteriorly positioned land areas; and attachment means between said rim portion and said tire rim disposed intermediate the attachment means for the drum for independently demountably securing said tire rim on said rim portion.

6. A wheel assembly in accordance with claim 5 in which the supporting structure between the hub and the rim portion comprises a plurality of spokes, each of said spokes having a land area thereon comprising the land area engaging one peripheral edge of the drum and said rim having the land area engaging the opposite end of the drum, and wherein the land areas on the external periphery of the rim portion engaged by said tire rim are in alignment with the spokes of the support structure.

7. In a wheel assembly for a motor vehicle, the combination of: a non-rotatable spindle for support of a wheel, a wheel having a rotatable bearing hub journaled on said spindle with anti-friction bearing means between said spindle and hub, a wheel spider radiating from the inboard end of said hub and having an annular rim portion integral with said spider projecting outboard in parallel relationship with the hub and encircling said hub whereby to provide an outboard open-sided wheel structure with the outboard end of said rim portion forming an outboard annular mounting ring around the hub; a brake drum within said rim portion and encircled by said rim portion, said brake drum having peripheral support areas at one edge thereof on the interior periphery of said mounting ring and other support areas at the opposite edge supporting the drum on said spider; a tire rim encircling said rim portion externally thereof and supported externally on the outboard edge of said mounting ring which supports said drum; and attachment means between said mounting ring and said drum and said tire rim respectively demountably attaching the said drum and the said tire rim to the said outboard end of said mounting ring, said attachment means for said tire rim and said drum being positioned on a common circle but in spaced relation to each other to provide for independent demounting of the said drum and rim.

8. In a wheel assembly for a motor vehicle, the combination of: a non-rotatable spindle for support of a wheel, a wheel having a rotatable bearing hub journaled on said spindle with anti-friction bearing means between said spindle and hub, a wheel spider radiating from the inboard end of said hub and having an annular rim portion integral with said spider projecting outboard in parallel relationship with the hub and encircling said hub whereby to provide an outboard open-sided wheel structure with the outboard end of said rim portion forming an outboard annular mounting ring around the hub; a brake drum within said rim portion and encircled by said rim portion, said brake drum having peripheral support areas at one edge thereof on the interior periphery of said mounting ring and other support areas at the opposite edge supporting the drum on said spider; a tire rim encircling said rim portion externally thereof and supported externally on the outboard edge of said mounting ring which supports said drum; and attachment means between said mounting ring and said drum and said tire rim respectively demountably attaching the said drum and the said tire rim to the said outboard end of said mounting ring, said attachment means for said tire rim and said drum being positioned on a common circle but in spaced relation to each other to provide for independent demounting of the said drum and rim, said spindle projecting through said bearing hub at the outboard end thereof; and a brake assembly stationarily mounted on said projecting end of said spindle and disposed within said drum, said brake assembly being removable through the outboard open side of said wheel.

9. In a wheel assembly for a motor vehicle, the combination of; a non-rotatable spindle for support of a wheel, a wheel having a rotatable bearing hub journaled on said spindle with anti-friction bearing means between said spindle and hub, a wheel spider radiating from the inboard end of said hub and having an annular rim portion integral with said spider projecting outboard in parallel relationship with the hub and encircling said hub whereby to provide an outboard open-sided wheel structure with the outboard end of said rim portion forming an outboard annular mounting ring around the hub; a brake drum within said rim portion and encircled by said rim portion, said brake drum having peripheral support areas at one edge thereof on the interior periphery of said mounting ring and other support areas at the opposite edge supporting the drum on said spider; a tire rim encircling said rim portion externally thereof and supported externally on the outboard edge of said mounting ring which supports said drum; and attachment means between said mounting ring and said drum and said tire rim respectively demountably attaching the said drum and the said tire rim to the said outboard end of said mounting ring, said attachment means for said tire rim and said drum being positioned on a common circle but in spaced relation to each other to provide for independent demounting of the said drum and rim, said spindle projecting through said bearing hub at the outboard end thereof; a brake assembly stationarily mounted on said projecting end of said spindle and disposed within said drum, said brake assembly being removable through the outboard open side of said wheel, a cover plate mounted on said brake assembly closing the open side of said wheel.

10. In a wheel and brake assembly for a motor vehicle, the combination of; a wheel comprising a bearing hub, a rim portion, and a support structure between the hub and rim portion; said support structure comprising a radially disposed wall extending from the inboard end of said hub and connecting with one end of said rim, said wall being integrally coextensive to form with said hub and rim an open ended dish shaped structure with said wall forming the inboard wall of the wheel, a plurality of webs within the dish shaped structure radiating between the bearing hub and the rim portion and projecting toward the open end of the structure and integrally coextensive with said wall, said webs being arranged in cooperating pairs with a wall connecting paired webs adjacent the said rim portion to provide thereby openings in the last mentioned wall adjacent said hub and said rim portion, said walls and webs providing radially disposed hollow reinforcing spokes with radially disposed chambers at the inboard side of the wheel, said first wall having openings adjacent said hub connecting the interior of the hollow spokes with atmosphere on the inboard side of the wheel for delivery of air into the hollow interior of the spokes, a brake assembly positioned within said dish shaped structure on the outboard side of said spokes to receive air circulated through said hollow spokes, and a closure plate covering the outboard open end of said brake chamber and having the periphery thereof in spaced relation to the periphery of the brake chamber to provide for exhausting of air from the brake chamber received from the said openings adjacent said rim.

References Cited in the file of this patent

UNITED STATES PATENTS

| | | |
|---|---|---|
| 1,685,294 | Rauch | Sept. 25, 1928 |
| 1,804,937 | Keller | May 12, 1931 |
| 1,925,598 | Nelson | Sept. 5, 1933 |
| 1,957,654 | La Brie | May 8, 1934 |
| 2,008,811 | Baker et al. | July 23, 1935 |
| 2,105,317 | Frank | Jan. 11, 1938 |
| 2,124,773 | Frank | July 26, 1938 |
| 2,431,667 | Frank | Nov. 25, 1947 |
| 2,446,699 | Garnett et al. | Aug. 10, 1948 |
| 2,457,344 | Butler | Dec. 28, 1948 |
| 2,649,922 | Hutchinson et al. | Aug. 25, 1953 |

FOREIGN PATENTS

| | | |
|---|---|---|
| 852,608 | France | Oct. 30, 1939 |